United States Patent
Wang et al.

(10) Patent No.: US 8,509,801 B1
(45) Date of Patent: Aug. 13, 2013

(54) METHOD TO BALANCE CHANNEL LOAD USING EXTENDED GLOBAL SERVICE REDIRECTION MESSAGE IN A SYSTEM ENVIRONMENT THAT SUPPORTS MULTIPLE BAND CLASSES

(75) Inventors: Chung-Ching Wang, Plano, TX (US); Ke-Chi Jang, Plano, TX (US); Jun Li, Richarson, TX (US)

(73) Assignee: Apple Inc., Cupertino, CA (US)

( * ) Notice: Subject to any disclaimer, the term of this patent is extended or adjusted under 35 U.S.C. 154(b) by 1834 days.

(21) Appl. No.: 11/246,758

(22) Filed: Oct. 7, 2005

Related U.S. Application Data

(60) Provisional application No. 60/617,318, filed on Oct. 8, 2004.

(51) Int. Cl.
*H04W 72/00* (2009.01)

(52) U.S. Cl.
USPC ........ 455/453; 455/422.1; 455/450; 370/230; 370/310; 370/329; 370/328; 370/341

(58) Field of Classification Search
USPC ............. 455/453, 3.01, 410, 450, 412.1, 466, 455/435.1, 422.1; 370/349, 230, 237, 253, 370/310, 329, 328, 341, 431, 468
See application file for complete search history.

(56) References Cited

U.S. PATENT DOCUMENTS

| | | | |
|---|---|---|---|
| 6,101,394 A * | 8/2000 | Illidge | 455/466 |
| 6,952,583 B1 * | 10/2005 | Park et al. | 455/434 |
| 2002/0090916 A1 * | 7/2002 | Abramovici et al. | 455/70 |
| 2003/0148764 A1 * | 8/2003 | Kelley | 455/434 |
| 2004/0136399 A1 * | 7/2004 | Roberts | 370/468 |
| 2004/0192304 A1 * | 9/2004 | Casaccia et al. | 455/435.1 |
| 2004/0266445 A1 * | 12/2004 | Burgess et al. | 455/450 |
| 2005/0255833 A1 * | 11/2005 | Bar-Or | 455/412.1 |

* cited by examiner

*Primary Examiner* — Ajit Patel
(74) *Attorney, Agent, or Firm* — Meyertons, Hood, Kivlin, Kowert & Goetzel, P.C.

(57) ABSTRACT

An extended global service redirection message (EGSRDM) is provided within the standards for mobile communications networks, where the EGSRDM supports multiple band class records within the common fields. The base station generates an EGSRDM with multiple band class records, with each band class assigned specific frequencies. When a mobile station (MS) receives the EGSRDM, the MS compares the parameters of the various band classes (frequency, ACCOLC, P_Rev) with those supported by the MS, and generates a list of the band class(es) from those provided within the EGSRDM that are supported by that MS. The MS then selects the first band class within the list and selects a frequency within the selected band class to assign to MS communication. When none of the frequencies within the selected band class is available, the MS selects the next band class within the created list and selects a frequency from the next band class.

23 Claims, 4 Drawing Sheets

METHOD TO BALANCE CHANNEL LOAD USING EXTENDED GLOBAL SERVICE REDIRECTION MESSAGE IN A SYSTEM ENVIRONMENT THAT SUPPORTS MULTIPLE BAND CLASSES

PRIORITY CLAIM

The application claims the benefit of priority under 35 U.S.C. §119(e) from U.S. Provisional Application No. 60/617,318, entitled, "Method To Balance Channel Load Using Extended Global Service Redirection Message In Multiple Band Classes Supported System Environment," filed on Oct. 8, 2004, the entire content of which are incorporated herein by reference.

BACKGROUND OF THE INVENTION

1. Field of the Invention

The present invention relates generally to mobile communication networks and specifically to use of overhead messages within mobile communication networks. Still more particularly, the present invention relates to a method, system, and mobile communications network that enable a single overhead message component to include multiple band-class records that are utilized by mobile stations to individually select a frequency for operation.

2. Description of the Related Art

As mobile communication technology improves, CDMA communication standards and systems have evolved from IS-95A and IS-95B systems to more modern IS-2000 communication systems. Mobile communication devices (e.g., base stations (BS) and mobile stations (MS)) may be designed to support one or more of these standards, and it is common for legacy devices (e.g., IS-95A MS) to be supported by the newer/more modern standards (i.e., IS-2000). Support for a particular standard is typically defined by providing the device with a particular protocol revision (P_Rev) value. For example, a protocol revision value for the IS-95A service may be 2 (range 0-2), a protocol revision value for the IS-95B standard may be 5 (range 3 to 5), and a protocol revision value for the IS-2000 standard may be 6 (or range 6+).

Conventional Code Division Multiple Access (CDMA) wireless/mobile communication systems comprise mobile switching centers (MSC) and base stations (BS) that transmit/communicate control information to mobile stations (MS) via various types of overhead messages. Conventional overhead messages are sent by a base station to all mobile stations to establish system operating parameters by communicating information that may be specific to the base station or may be common to the entire system. For example, the BS of a mobile communication system typically also supports a plurality of frequency assignments. To inform a mobile station (e.g., cellular telephone) of the supported frequencies, the BS generates and sends to the MS a CDMA channel list message (CCLM) for IS-95A operation or an extended CDMA channel list message (ECCLM) for IS-2000 operation. Generally speaking, only one or the other of the CCLM and ECCLM is received by a mobile station at any given time, since IS-95A and IS-95B configured base systems only send out a CCLM while IS-2000 base systems only send out an ECCLM. Both message-types are overhead messages sent out over a forward paging channel or a forward broadcast control channel.

In addition to the above messages, the TIA/EIA (Telecommunications Industry Association/Electronic Industries Association) IS-2000 standard provides an Extended Channel Assignment Message (ECAM) that includes the capability for a communication system to assign a mobile station (MS) to a paging channel or a traffic channel in a different, alternate frequency band class than a frequency band class initially accessed by the MS. Additionally, in conventional network communication systems that support multiple band classes, the BS is able to utilize service redirection messages to redirect mobile stations to different band classes. One such redirection message in the IS-2000 standard is the (Extended) Global Service Redirection Message (EGSRDM). EGSRDM is a broadcast-type message, and conventional EGSRDM structure only allows one band class record to be provided within the single message to redirect a group of mobile stations to the band class. When an EGSRDM is utilized, each MS that meets the requirements for redirection will be redirected to the new band class specified in the message. In some implementations, after the mobile station moves to the new band class, the BS may transmit an ECCLM that may move the mobile station(s) to a different frequency supported within that band class. In current CDMA system, a BS may perform some balancing of the system load by redirecting some mobiles to other supported frequencies within the same band class.

Conventional EGSRDM are able to specify only one redirection record (corresponding to a single band class), although current communications systems typically support multiple band classes. Given this limitation, the current EGSRDM structure is thus incapable of efficiently directing different groups of MSs to different band classes when multiple band classes are supported in the system. That is a single EGSRDM is not able to redirect different groups of mobile devices to multiple band classes and the BS is made to complete. Redirection of different groups necessarily requires the BS issue multiple EGSRDMs (overhead messages) with each message having a different redirection record included therein. Such a process leads to (a) congestion/cluttering of the network (or control channels) with these multiple broadcasts and (b) also forces all mobile devices to continually update the overhead messages, leading to greater power consumption by the devices.

Further, due to the capacity limitation of some legacy mobiles, some networks are forced to direct all mobiles (with any MOB_P_REV revision) to the same frequency that only supports legacy channels (e.g., Paging Channel). The BS then uses EGSRDM to redirect all mobiles that supports new common channel types (e.g., BCCH) to the frequency that support the new common channel types. Since with current EGSRDMs, the BS is only allowed to include one redirection record in a message to redirect a group of mobile stations to a single band class, if a network supports multiple band classes, the BS must first utilize an EGSRDM to redirect a group of mobiles to a frequency on different band class or to a frequency on the same band class that support different type of common channel. The frequency allocation may then be provided by the BS transmitting an ECCLM to distribute mobiles to different frequencies on that band. However, when there are multiple groups of mobiles, with each group having different system selection criteria (i.e., supporting different bands), the use of conventional EGSRDM methods does not allow the BS to simultaneously redirect each of these different groups of mobile devices with a single overhead message. That is, use of a single EGSRDM with its single redirection record is typically not flexible enough for an operator to effectively balance the existing load, when the BS and MS support multiple band classes.

The following summarizes several of the limitations/issues found with current EGSRDM structure:

(1) EGSRDM has only been available since IS-2000 Rel 0, and Rev 0 mobile device(s) does not support Rev A common channels (e.g. BCCH). The BS is unable to utilize single EGSRDM to direct IS-95 and Rev 0 mobile device(s) to a Paging Channel and Rev A mobile device(s) to Rev A new common channels (e.g., BCCH);
(2) If two (or more) band classes are available in the system, and both band classes supports PCH and BCCH, the BS is unable to efficiently distribute Rev 0 mobile device(s) and post Rev 0 mobile device(s) among all the supported band classes with one redirection record; and
(3) While the BS is able to utilize EGSRDM to redirect all the post Rev 0 mobile device(s) to a frequency that supports new common channels, if multiple band classes are supported, the BS needs to send another EGSRDM to redirect some post Rev 0 mobile device(s) to a different band class. This process requires at least two EGSRDMs to move mobile device(s) to multiple different band classes. If Rev 0 mobiles represent the majority of mobile stations in the system, the BS needs to send multiple EGSRDMs, each targeting a different group of mobile stations in order to achieve load balance among all the supported band classes. This process will force all mobile devices to perform multiple rounds of overhead message updates, which negatively impact mobile performance.

SUMMARY OF THE INVENTION

Disclosed are a mobile communications network, base station, mobile station, and computer-implementable method for enabling multiple band class records to be included within a single overhead message component utilized by mobile stations to select a frequency for communicating within the mobile network. An extended global service redirection message (EGSRDM) is provided within the standards for mobile communications networks, where the EGSRDM supports inclusion of multiple band class records within the common fields of the EGSRDM. The network comprises a base station and multiple mobile stations, which respectively generates and utilizes an EGSRDM having multiple band classes. Each band class record is provided specific parameters, including ACCOLC, P-rev value, and associated frequencies. A particular frequency may be included within multiple band class records.

When a mobile station (MS) receives the EGSRDM, the MS compares the parameters of the various band class (frequency, ACCOLC, P-Rev) with those supported by the MS, and the MS generates a list of the band class(es) from those provided within the EGSRDM that are supported by that MS. The MS then selects the first band class within the list and selects a frequency within the selected band class to assign to the MS operations. When none of the frequencies within the selected band class are available to be assigned, the MS selects the next band class within the list and selects a frequency from the next band class.

Each MS (or group of mobile stations) may support a different priority system selection mechanism, based on the P_Rev value assigned to the MS, access overload class of the MS, and the particular version of the ISA standard supported by the MS (e.g., IS-95A or IS-2000). Once the overhead message is broadcasted to the MS, each MS itself determines which one of the band classes to select based on the MS' particular configuration. Each mobile station executes a band class (or record) selection utility that provides a selection method for selecting the band class(es) for that type of mobile station and ultimately selecting the frequency.

In one implementation, the process of providing multiple records that are independently selectable by different mobile stations enables load-balancing among the various channels (band classes and frequencies) via the single EGSRDM, whose multiple-record configuration enables distribution of different groups of mobile stations (with different operating parameters) to different band classes. The base station completes load distribution and/or allocation (i.e., load balancing) based on a formula that provides some balancing of communication loads across the system. The distribution of band classes among different mobile groups is then enabled by providing multiple band class records within the single EGSRDM, where each band class has an associated list of frequencies that are assigned to specific groups of MS's. The MS implements a channel hashing algorithm to randomly choose one of the frequencies within selected band class records. The communication network is thus able to achieve a certain degree of channel load balance due to the flexibility of the EGSRDM message structure.

The above, as well as additional purposes, features, and advantages of the present invention will become apparent in the following detailed written description.

DESCRIPTION OF FIGURES

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

Several acronyms are utilized within the description of the invention. These acronyms and their respective meanings are as follows:
ACCOLC—Access Overload Class;
BCCH—Broadcast Control Channel;
BS—Base Station;
MS—Mobile Station
ECCLM—Extended CDMA Channel List Message EGSRDM—Extended Global Service Redirection Message
MOB_P_REV—Mobile station Protocol Revision
P_REV—(Base station) Protocol Revision
P_REV_IN_USE—Protocol Revision In Use; P_REV_IN_USE is set to the minimum of MOB_P_REV and P_REV.

The present invention provides a mobile communications network, base station, mobile station, and computer-implementable method for enabling multiple band class records to be included within a single overhead message component utilized by mobile stations to select a frequency for communicating within the mobile network. An extended global service redirection message (EGSRDM) is provided within the standards for mobile communications networks, where the EGSRDM supports inclusion of multiple band class records within the common fields of the EGSRDM. The network comprises a base station and multiple mobile stations, which respectively generates and utilizes an EGSRDM having multiple band classes. Each band class record is provided specific parameters, including ACCOLC, P-rev value, and associated frequencies. A particular frequency may be included within multiple band class records.

When a mobile station (MS) receives the EGSRDM, the MS compares the parameters of the various band class (frequency, ACCOLC, P-Rev) with those supported by the MS, and the MS generates a list of the band class(es) from those provided within the EGSRDM that are supported by that MS. The MS then selects the first band class within the list and selects a frequency within the selected band class to assign to the MS operations. When none of the frequencies within the selected band class are available to be assigned, the MS selects the next band class within the list and selects a frequency from the next band class.

Each MS (or group of mobile stations) may support a different priority system selection mechanism, based on the P_Rev value assigned to the MS, ACCOLC of the MS, and the particular version of the ISA standard supported by the MS (e.g., IS-95A or IS-2000). Once the overhead message is broadcasted to the MS, each MS itself determines which one of the band classes to select based on the MS' particular configuration. Each mobile station executes a band class (or record) selection utility that provides a selection method for selecting the band class(es) for that type of mobile station and ultimately selecting the frequency.

Figure 1A:
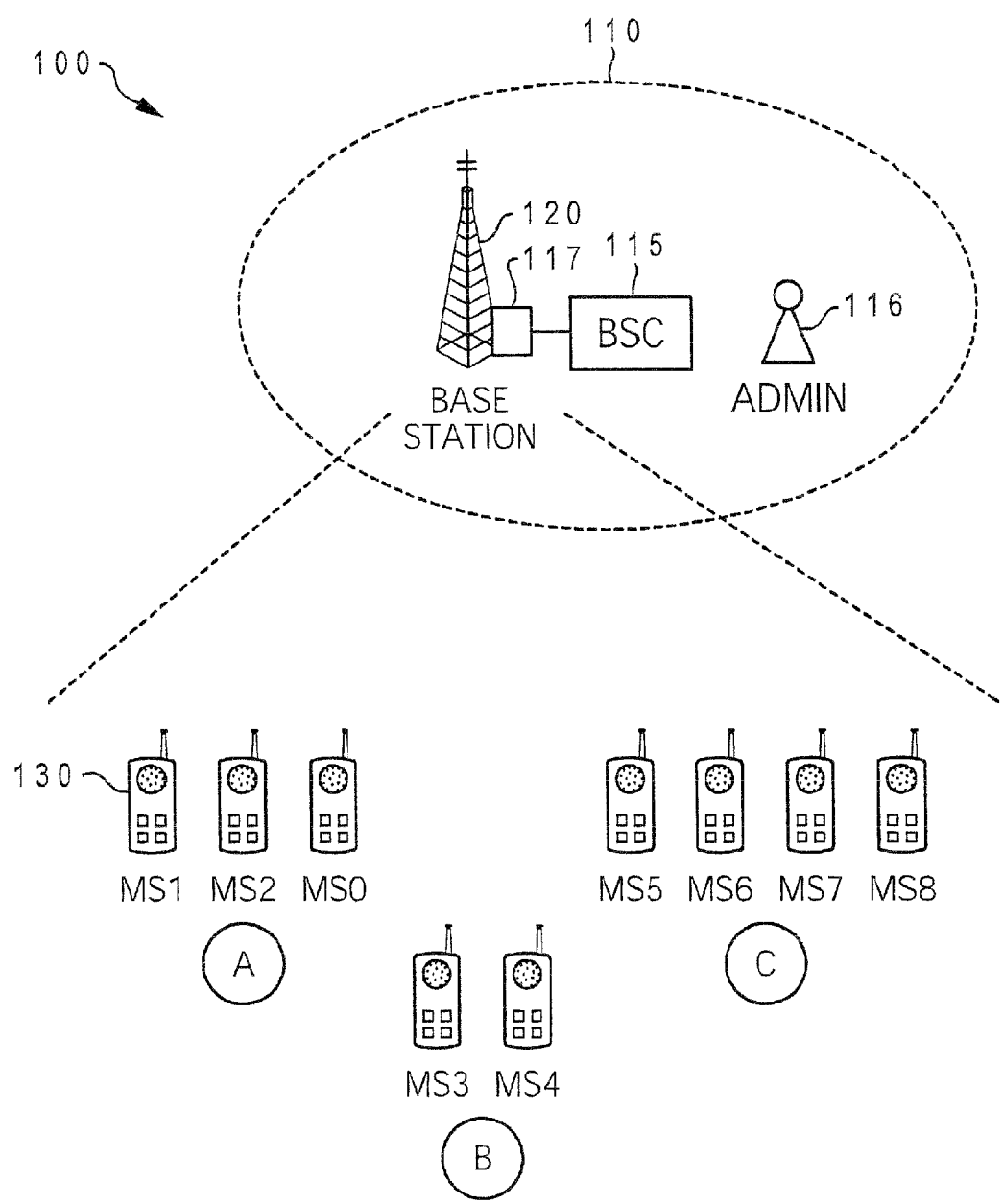
FIG. 1A depicts an illustrative embodiment of a mobile communication network with a base station and multiple mobile stations (cellular phones) within which the features of the present invention may advantageously be implemented.

With reference now to the figures, and in particular to FIG. 1A, there is illustrated an exemplary mobile (or wireless) communications network within which various features of the invention may advantageously be implemented. Mobile communications network 100 is assumed to be a CDMA network, although the invention is applicable to other types of communication networks. Mobile communication network 100 comprises a plurality of mobile stations (MS) 130 in wireless communication with a base system infrastructure 110. MS 130 are illustrated as cell-phones, but may include other types of wireless communication devices.

Base system infrastructure 110 comprises base station (BS) 117, having a base transceiver station (BTS) 120 operably coupled to a base station controller (BSC) 115. According to the invention, BS 117 is capable of providing communications services in each of multiple band classes to mobile stations 130 located in a coverage area serviced by the BS 117. The coverage area may be subdivided into multiple sectors, or cells, that are each served by a BTS 120. Within FIG. 1A, only one BTS 120 is illustrated providing a single sector (represented by the dashed lines spanning the mobile stations 130). Accordingly, BS 117 covers one cell/sector region, and controls a plurality of mobile stations included in its cell/sector region. This specific representation is provided for illustration only, as BS 117 may include multiple BTS's 120 which each provide multiple sectors/cells around the BTS 120.

Also, according to CDMA protocols for mobile communication systems, control processes involve generation of control messages at the BS 117, broadcasting of the control message to the mobile stations 130 via the BTS 120, and implementation of the control process so identified at the mobile stations 130. Base station components 117/120 of mobile communications network 100 are all assumed to be designed to support IS-2000 or later standard, while the mobile stations 130 may be designed to support one or more of a future standard, IS-2000 standard or one of the legacy standards, e.g., IS-95A, IS-95B.

BS 117 is illustrated with an administrator 116, who maintains BS 117 in working order and provides manual programming, updates and trouble shooting services, and the like. Administrator 116 may also be responsible for installing necessary software upgrades and hardware components to enable BS to perform various features of wireless communication, including the specific features described herein, in particular, which features may be provided via executable software code on a computer readable medium.

FIG. 1A provides three groups of MS 130, group A (with MS0, MS1, MS2), group B (MS3, MS4), and group C (MS5, MS6, MS7, MS8). As will become clearly below, each group corresponds to a classification/type of MS 130 that may support a different band class and/or operate at a different channel and/or frequency from the other group(s). Additionally, each MS within a group may share a value of Mob_P_Rev, or an ACCOLC value, among other shared-identifying parameters/characteristics. Thus differentiation of MS's is necessary to illustrate the automatic band class selection and associated channel load-balancing features of the invention, which are described in greater details below with reference to the processes illustrated by FIGS. 3A-3B.

Figure 1B:
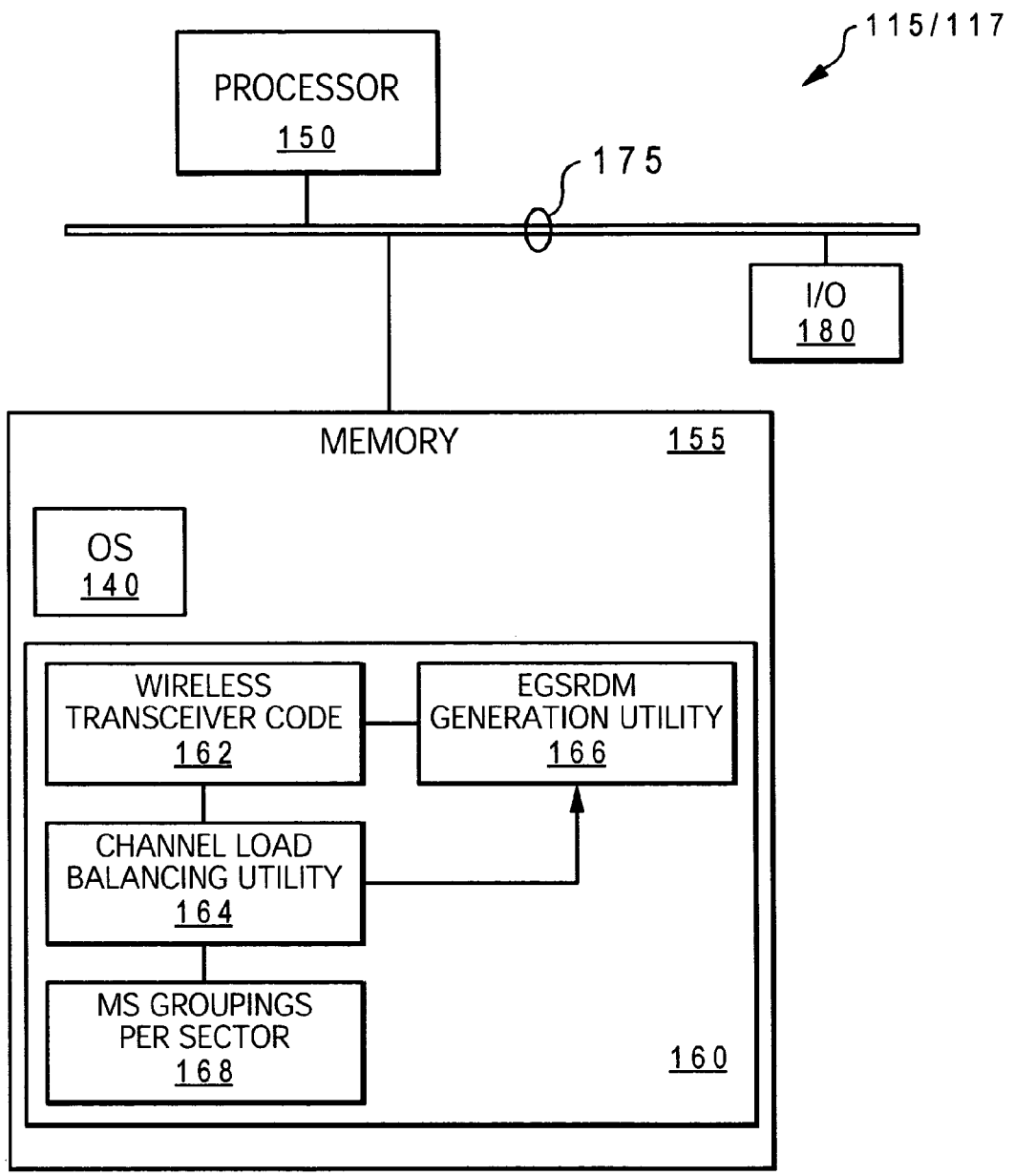
FIG. 1B is a block diagram depicting various hardware and software components of an exemplary base station/base station controller according to one embodiment of the present invention.

Turning now to FIG. 1B, there is illustrated an exemplary BS 115 or specifically the BSC 117, which performs the processing features of the BS 115. Each BS/BSC 115/117 comprises a processor 150 and a memory 155 that stores programs and software (applications, utilities and operating protocols), that are executed by the processor and that permit the functioning of the BS/BSC 115/117 in mobile communication network 100. BS/BSC 115/117 also comprises I/O component(s) 180 to enable an administrator 116 to interact with, update, and/or provide support for BS/BSC 115/117. Hardware components are interconnected via a system interconnect 175. Notably, various other types of hardware devices may be required to enable BS/BSC 115/117 to perform their specific function(s); however, the illustration herein is not meant to be inclusive of all such devices and only provides the processing capabilities required to generate the overhead messages described herein.

Located within memory 155 are operating system (OS) 140 and a network communication utility 160, which includes therein all of the code/subroutines/algorithms utilized by processor 150 to enable BS/BSC 115/117 to provide the functions of BS, including generation of the multiple-record EGSDRM, and communicating with MS's 130 and other BS's (not specifically shown). Among the software components within network communication utility 160, key utilities shown include: (1) wireless transceiver code 162, which supports/controls the hardware transmitter and receiver devices of the BS; (2) channel load-balancing utility 164, which performs monitoring of the channel loading at the BS and allocation of load to various channels and/or frequencies; and (3) EGSRDM utility 166, which provides for generation of the EGSRDM to include multiple band class records with associated frequencies (as further described below). Thus, according to the illustrative embodiment, key functionality provided by the invention is encoded within the EGSRDM utility 166, which may in turn receive/monitor input from channel load-balancing utility 164, in one embodiment. In one embodiment, network communication utility 160 comprises a table of MS groupings per sector 168, including their registered Mob_P_Rev values, and a list of channels/frequencies (not shown) within each band class.

It should be noted that the device illustrated by FIG. 1B may also be utilized as an exemplary MS 130, which also includes the above described hardware components and some of the software components. Notably, however, rather than EGSRDM utility 166, an exemplary MS 130 would include a band class (or record) selection utility that is utilized to perform the various selection processes described below with reference to FIGS. 3A and 3B.

According to the described embodiment, MS 130 is designed/configured to support multiple band classes. Each band class of the multiple band classes supported by BS 115 is associated with a particular frequency bandwidth and a particular signal modulation scheme and is further associated with one of multiple forward links and one of multiple reverse links. Each MS 130 is capable of operating in (i.e., supporting) at least one band class of the multiple band classes supported by BS infrastructure 110, and the memory of MS 130 further stores information concerning each band class that can be supported by the MS 130, such as the list of supported band classes and/or their operating parameters (P_Rev values, and others).

BS 117 provides support for well-known protocols to enable each MS 130 to establish a connection with an external network (not shown) via BS infrastructure 110. In one embodiment, BS 117 also provides enhanced channel load balancing features via the expanded EGSDRM. In the described embodiment, mobile communication network 100 operates in accordance with the 3GPP2 and TIA/EIA (Telecommunications Industry Association/Electronic Industries Association) IS-2000 standards, which provide a compatibility standard for cdma2000, including IS-2000 air interfaces. The standard specifies wireless telecommunications system operating protocols, including radio system parameters and call processing procedures. However, those who are of ordinary skill in the art realize that mobile communication network 100 may operate in accordance with any one of a variety of wireless communication systems, such as a Global System for Mobile communication (GSM) communication system, a Time Division Multiple Access (TDMA) communication system, a Frequency Division Multiple Access (FDMA) communication system, or an Orthogonal Frequency Division Multiple Access (OFDM) communication system.

The invention provides a modification to EGSRDM design/configuration protocol to enable inclusion of multiple redirection records. The multiple-record EGSDRM is an overhead message sent out from a base station to all mobile stations on a forward CDMA channel such as a paging channel or a broadcast control channel. The overhead messages have different fields according to a protocol revision value, and in the illustrated embodiments, the mobile station(s) are programmed to recognize these different fields. With the modification, a BS is now able to include multiple redirection (band class) records in a single EGSRDM, where each record may target a specific group of mobiles with a unique system selection list. The BS is further able to utilize this modified EGSRDM to redirect different groups of mobiles to the intended band class. In one embodiment, the first record is always the one currently existing, with P_REV=7.

Multiple-record EGSRDM includes several fields, each assigned a number of bits for holding corresponding information. The fields are assigned in accordance with the embodiment of the present invention, although the particular order of the fields is determined by the IS-2000 protocol standards, which has been modified to account for the multiple-record EGSRDM of the invention. The modification to the standards is provided within Appendix A, attached hereto, the entire contents of which is hereby incorporated herein by reference. Table I below illustrates relevant portions of a multiple-record EGSRDM overhead message according to an embodiment of the present invention.

As provided by the table below, the EGSRDM is enhanced with the capability to include additional multiple band-class records. The order/sequence of the fields within the EGSRDM (as shown by Table I) indicates that these additional records are provided within the common fields at the end of the EGRDSM. A definition of each of the added fields is provided within Section 3.7.2.3.2.27 of Appendix A. Two preliminary fields are provided before the fields directly associated with the band class records. The functionality of a first preliminary field, Last Search Record Ind is described below. The second preliminary field, num_add_record, provides the number (count) of band-class records that are provided within the EGSRDM. Three bits are allocated to this field indicating that, for this illustrative embodiment, as many as seven band-class records may be provided within the single EGSRDM (001-111). The embodiment assumes that a value of 000 indicates that there is no band-class record within the EGSRDM and/or an error (or failed) condition within the EGSRDM. It should be noted that the specific location of the band class fields at the end of the EGSRDM (within the common fields) enables the EGSRDM to be utilized with other existing as well as future record types in addition to those of CDMA technology (record type 2). Also, with this assignment scheme, records supporting different communication technologies (e.g., CDMA and GSM) may be provided within the same the EGSRDM.

TABLE I

| Field | Length (bits) |
|---|---|
| PILOT_PN | 9 |
| CONFIG_MSG_SEQ | 6 |
| REDIRECT_ACCOLC | 16 |
| RETURN_IF_FAIL | 1 |
| DELETE_TMSI | 1 |
| REDIRECT_P_REV_INCL | 1 |
| EXCL P_REV_IND | 0 or 1 |
| REDIRECT_P_MIN | 0 or 8 |
| REDIRECT_P_MAX | 0 or 8 |
| RECORD_TYPE | 8 |
| RECORD_LEN | 8 |
| Type-specific fields | 8 RECORD_LEN |
| LAST_SEARCH_RECORD_IND | 1 |
| NUM_ADD_RECORD | 3 |
| {(NUM_ADD_RECORD) | |
| ADD_REDIRECT_ACCOLC | 16 |
| ADD_DELETE_TMSI | 1 |
| ADD_REDIRECT_P_REV_INCL | 1 |
| ADD_EXCL P_REV_IND | 0 or 1 |
| ADD_REDIRECT_P_MIN | 0 or 8 |
| ADD_REDIRECT_P_MAX | 0 or 8 |
| ADD_RECORD_TYPE | 8 |
| ADD_RECORD_LEN | 8 |
| Type-specific fields | 8 RECORD_LEN |
| ADD_LAST_SEARCH_RECORD_IND | 1 |
| }(NUM_ADD_RECORD) | |

Figure 2:
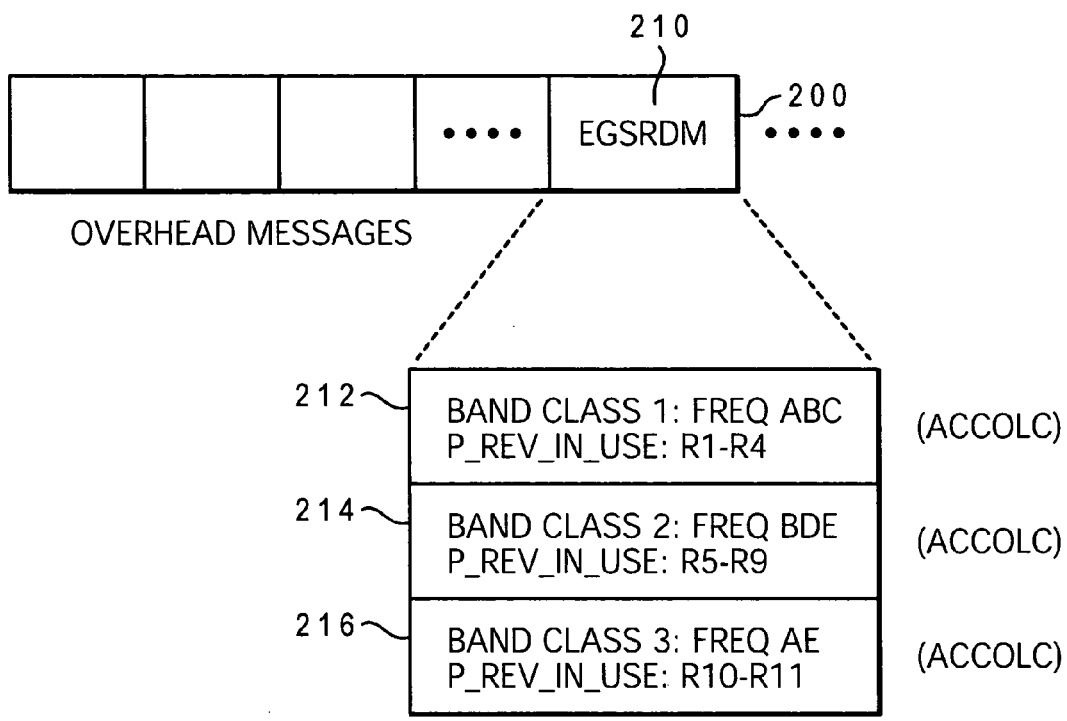
FIG. 2 illustrates an exemplary multiple-record (EGSRDM) configured with multiple band class records encoded therein according to one embodiment of the invention.

FIG. 2 illustrates an exemplary overhead message that comprises a multiple-record EGRDSM. As shown by the illustration, overhead message 200 comprises EGRSDM 210, which includes multiple band class records. Three band class records are shown, band class1 212, band class2 214 and band class3 216. Each band class record has included therein a list of frequencies that are supported by or provided within that band class. For simplicity, the frequencies are provided as alphabetized names (A, B, . . . E), which each correspond to some actual frequency (e.g., 0.5, GHz, 0.625 GHz, 1 GHz). From the illustration, it is shown that a same frequency (e.g., frequencies A or E) may be supported by different band classes. Thus, band class1 212 includes a list of frequencies A, B, and C, while band class2 114 contains frequencies B, D, E, and band class3 116 contains frequencies A and E. In one embodiment, multiple different band-classes are defined for each record and each unique band class may share some overlapping frequencies. In another embodiment, a single band class may be represented two or more times with different frequencies supported by that band class identified within each specific representation.

In addition to the frequency list per band class, each band class also has included therein a range of protocol revision (P_Rev) values, which corresponds to the Mob_P_Rev value of the mobile stations supported by the particular band class. The protocol revision value represents a service provided by the base station. As previously described, mobile stations that have particular P_Rev values may not be able to operate at certain band classes/frequencies/services that do not support those P_Rev values.

With convention systems, the protocol revision value 2 may be provided at power up of an IS-95A base station and the IS-95A base station will set a P_REV field value in a sync channel message field to "2" before transmitting the sync channel message to the IS-2000 mobile station. The IS-2000 mobile station then compares the P_REV value included in the sync channel message with a protocol revision value supported by the IS-2000 mobile station, and operates in a mode of supporting the service corresponding to the smaller protocol revision value. Generally, when a protocol revision value indicates the service supported by the MS is equal to or larger than a preset protocol revision value (e.g., a protocol revision value for the IS-95A base station), and also equal to or larger than a P_REV value included in the received message, the P_REV value indicates support for either the IS-95B service or the IS-2000 service.

At the MS, the process of determining which records are qualified records (i.e., a record of a supported band class), involves a comparison of the Mob_P_Rev value to the P_Rev values of the multiple band class records within the EGSRDM. Based on these P_Rev values, the mobile station is aware of how many qualified records (e.g., the MOB_P_REV of the mobile is in the P_REV_IN_USE inclusion range of the first qualified redirection record) may be utilized for completing system selection. Notably, in one embodiment, when the LAST_SEARCH_RECORD of the first record is set to '1', the mobile station only utilizes the first qualified redirection record to perform the system selection. The mobile station utilizes its own set of criteria to determine which record is the best record for MS operation.

In the illustrative (and other) embodiments, multiple redirection records are allowed within the EGSRDM (as shown by Table I and FIG. 2) to increase the flexibility of EGSRDM. With the modification to EGSRDM, the BS is able to include multiple redirection records within the EGSRDM, perhaps based on the current need of the base station to achieve a desired level of load balance. The illustrative embodiment requires a set of global changes to EGSRDM generation procedure, provided by the EGSRDM utility of the BS generating the EGSRDM. Among these changes are the following:

(a) Modify the EGSRDM to support multiple band class records. In each record, an additional band class and the associated frequencies available for this additional band class are specified. A band class can be associated with more than one band class records and the frequencies may be repeated in the various band classe records;

(a) Each of the redirection records may include or exclude mobile devices based on the mobile's ACCOLC or MOB_P_REV and the given P_REV_IN_USE range for that record; and (b) Provide a LAST_SEARCH_RECORD bit for each record for use by the mobile station when selecting a frequency from the band class record.

Figure 3A:
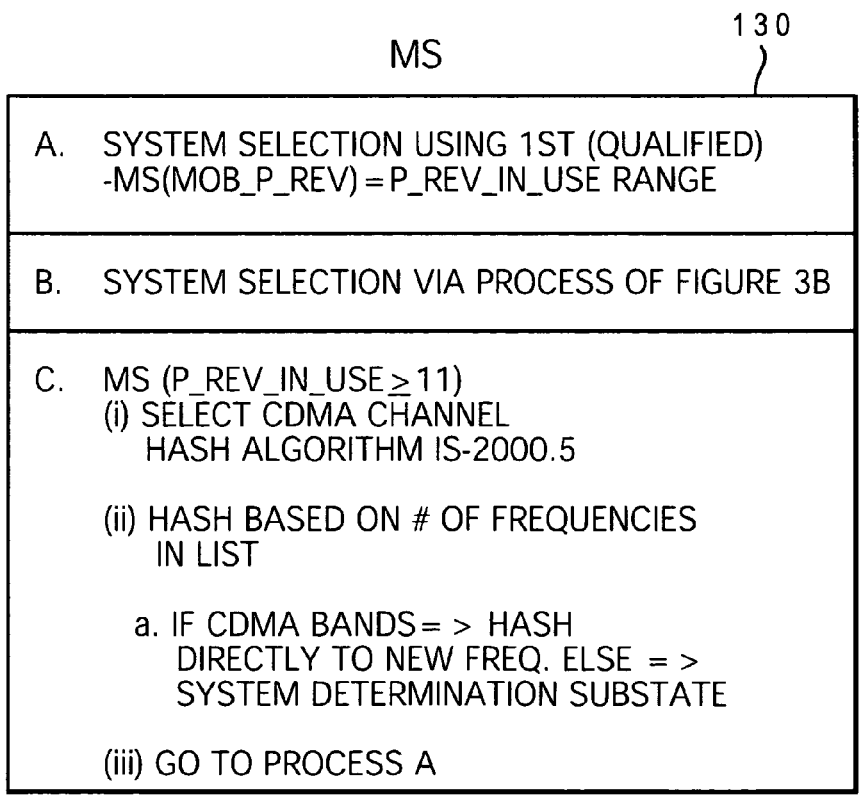
FIG. 3A represents band class and frequency selection mechanisms of a mobile station that provides a selection of an available frequency within one of multiple supported band classes provided within a multiple-record EGSRDM, according to embodiments of the invention.

Once a multiple-record EGSRDM has been created at the BS, the BS places the EGSRDM in an overhead message which is broadcasted to MS's throughout the network (i.e., MS's within range of the BS). In order to enable the MS to recognize and make use of the multiple records within the EGSRDM, a special band class selection utility is provided and executed on each MS that performs the specific selection features associated with receipt of a multiple-record EGSRDM. The invention operates in environment that may comprise both IS-2000 (CDMA) standard MS's and earlier and/or future communication standard MS's. With legacy devices that have not been upgraded, only the first band class record is recognized and processed as per conventional methods. FIG. 3A illustrates the three possible responses of a MS to receipt of the multiple-record EGSRDM. These responses depend on the programming provided within the MS, which programming may be updated post-manufacture of the MS.

Figure 3B:
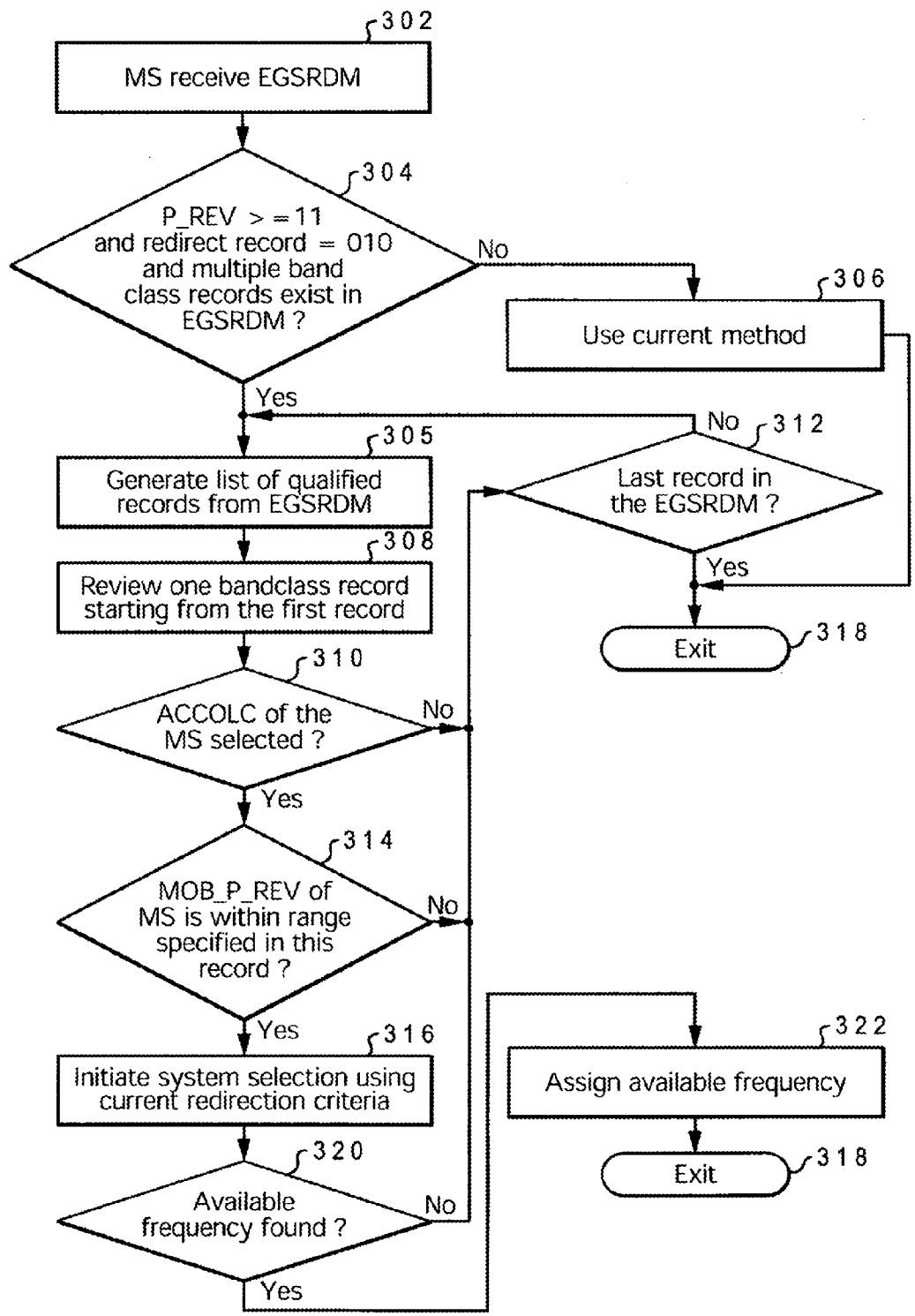
FIG. 3B is a flow chart of process steps that are performed by band class (record) selection utility within a mobile station on receipt of a multiple-record EGSRDM to enable selection of a frequency from among multiple provided band class records, according to embodiments of the invention.

The flow chart of FIG. 3B illustrates one embodiment of processes provided by the utility in performing record and frequency selection and channel load balancing among multiple MS's 130. The process of FIG. 3B begins at block 302 at which the MS (assumed to be configured with the band class selection utility) receives an EGSRDM. The MS checks three inclusion requirements to determine whether the record satisfies the ACCOLC check, inclusion rule and exclusion rule. Specifically, at block 304, the MS completes a check of whether (a) the value of P_Rev is greater than or equal to 11 and (b) redirect record=010 and (c) multiple band class records exist within the received EGSRDM. When one or more of these checks yields in a negative result, then the MS defaults to utilizing the conventional method, as indicated at block 306. This conventional method includes simply selecting a first/next frequency in a first band class record supported or defaulting to a currently utilized frequency. Then the process ends at termination block 318.

When all three criteria from block 304 are met (i.e., when all of the three inclusion requirements are satisfied/met), the mobile station parses the EGSRDM, and the MS then compiles a super list of all qualified records (band classes and their associated frequencies) found within the EGSRDM, as provided at block 307. In one implementation, the MS stores the redirection parameters (associated frequencies, etc.) of each record in REDIRECT_REC_LIST[k], where k is a number ranging from 1 to the number of qualified records to be stored). Then, as shown at block 308, MS initiates a review of the band class records beginning with the first record in the list and continuing sequentially until an assignment is made or the last record is reviewed. A determination is made at block 310 whether the ACCOLC of the current record corresponds to that of the MS. If not, the process iterates to the next record within the list, unless that record is determined at block 312 to be the last qualified record. When there are no more records within the qualified list, the process ends at block 318.

If the ACCOLC of the current record corresponds to that of the MS, a next determination is made at block 314 whether Mob_P_Rev of the MS is within the range specified in the presently selected record. If the Mob_P_Rev of the MS is within the specified range, the MS performs system selection utilizing the current redirection criteria, as shown at block 316. These criteria may involve checking each frequency in sequence for availability, for example.

The MS utilizes the redirection parameters associated with REDIRECT_REC_LIST [current record] to perform system selection by scrolling through each frequency associated with the particular record and checks at block 320 whether the frequency is available and is one supported by the MS. If yes, the frequency is assigned to the MS at block 322, and the process terminates at block 318. According to the described embodiment, when a current frequency is not available to be assigned, the process iterates to the next frequency of the current record until the last frequency in the record is checked. When no frequency within that record is available and/or assigned, the MS determines at block 312 whether the current record is the last qualified record in the list. If the record is not the last record, the process of selecting a next record and iterating through the frequencies is repeated. That is, when the LAST_SEARCH_RECORD parameter has a value of 1, the MS begins a search of a next available record. When the parameter value is not 1, indicating the current record is the last record, the MS sets the RETURN_IF_FAIL parameter and then the process ends at termination block 318.

Load Balancing

FIG. 3A illustrates alternative mechanisms/methods that may be utilized by an exemplary MS to perform the band class and frequency selection processes, other than that described above. A most basic implementation (A) involves legacy MS's that do not support the selection from among multiple records within an EGSRDM, as provided herein. These MS's implement the standard process of selecting frequencies from within a single band class record, which is assumed to be the first band class record provided within the EGSRDM. Other implementations may call for a different band class record to be selected.

In a next implementation (C), the process of providing multiple records that are independently selectable by different mobile stations enables load-balancing among the various channels (band classes and frequencies) via the single EGSRDM, whose multiple-record configuration enables distribution of different groups of mobile stations (with different operating parameters) to different band classes. The base station completes load distribution and/or allocation (i.e., load balancing) based on a formula that provides some balancing of communication loads across the system. The distribution of band classes among different mobile groups is then enabled by providing multiple band class records within the single EGSRDM, where each band class has an associated list of frequencies that are assigned to specific groups of MSs. The communication network is thus able to achieve a certain degree of channel load balance due to the flexibility of the EGSRDM message structure.

In one implementation of this second embodiment, during the redirect process, the functionality of multiple-record EGSRDM are utilized to balance the load by enabling the MS's to hash to different bands and frequencies among the available records. This second embodiment requires similar changes to the standards to enable multiple-record EGSRDM and a BS that generates and provides support for a multiple-record EGSRDM. Additionally, this embodiment provides a new system selection modes, including (i) allowing MS (for P_REV_IN_USE 11 or greater mobiles) to build a CDMA channel list, then (2) enabling the MS to randomly select a specific CDMA channel for system selection utilizing a hashing algorithm, such as is specified in the IS-2000.5. Channel hashing (or simply hashing) refers to the process of randomly determining one frequency assignment for selection and service. With hashing, the MS selects a frequency based on the list and hashes to that frequency. The hashing algorithm provides a random process that selects the particular frequency to be utilized.

With the present described embodiment, the MS selects a CDMA channel (i.e., performs a service frequency assignment) from the subset of channels associated with a selected band class among the list of qualified band classes retrieved from the multiple record EGSDRM. The subset of channels is assumed to include only those channels that provide support for the particular MS. Accordingly, the mobile station performs channel hashing to select a service frequency assignment from the entire CDMA channel subgroups within the qualified list of band classes.

To achieve frequency load balancing, the BS may repeat a frequency in the CDMA channel list multiple times. The MS then hashes based on the number of frequencies in the channel list. If the hashed frequency is in the CDMA BANDs (in current band class), then the MS does not go through the system determination substate. Rather, the MS hashes directly to the new frequency in the current band class. If the hashed frequency is not in the current band class, the MS then goes to system determination substate or utilizes existing methods of completing the system selection. In one embodiment, the MS is also provided the functionality of defining within the new system selection mode how to reselect the system in case the CDMA channel hashed to is not supported by the MS.

As noted above, implementation of the invention involves making several recommended changes to the text of the existing IS-2000 Standard. APPENDIX A, attached hereto and incorporated herein by reference, provides a detailed recitation of these changes. Key provisions among the proposed standard changes have been described above and are further detailed within the relevant sections and subsections of Appendix A for which the changes are recommended.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, and CD ROMs.

While the present invention has been particularly shown and described with reference to particular embodiments thereof, it will be understood by those skilled in the art that various changes may be made and equivalents substituted for elements thereof without departing from the spirit and scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the specification and appended claims.

What is claimed is:

1. In a mobile communication network, a method for providing an extended global service redirection message (EGSRDM), said method comprising:
generating the EGSRDM with a plurality of standard fields;
adding a first set of fields that defines the EGSRDM as a multiple-record EGSRDM;
encoding a plurality of band class records within the EGSRDM, said band class records corresponding to respective band classes and each band class record comprising an associated P_Rev value, a list of frequencies supported by the corresponding band class, and an ACCOLC;
subsequently placing said multiple-record EGSRDM within an overhead message being broadcast into the network, wherein said multiple-record EGSRDM is designed to trigger a particular frequency selection mechanism at a mobile station that receives the multiple-record EGSRDM;
allocating band class records for inclusion within the EGSRDM based on an analysis of network load conditions; and
providing within each band class record particular frequencies that have relatively more available bandwidth among all frequencies supported by the particular band class.

2. The method of claim 1, further comprising overlapping use of a particular frequency among multiple band class records for respective band classes.

3. The method of claim 1, further comprising broadcasting the overhead message containing the multiple-record EGSRDM.

4. The method of claim 2, further comprising overlapping use of a particular frequency among multiple band class records when that particular frequency has lower than average bandwidth usage.

5. A base station comprising hardware and software components that together enable the method steps for generating the multiple-record EGSRDM and broadcasting the multiple-record EGSRDM within an overhead message according to claim 1.

6. In a mobile communications network having a base station that generates multiple-record EGSRDMs, a mobile station (MS) comprising:
an element to receive an overhead message being broadcasted within a broadcast range of the network within which the MS is located;
a memory within which a band class selection utility is stored for use in selecting one or more band classes from a received EGSRDM that includes multiple band class records for multiple respective band classes;
a processor that executes said band class selection utility, which when executed performs:
retrieving the EGSRDM from the overhead message;
determining whether the EGSRDM is a valid multiple-record EGSRDM by determining when the EGSRDM satisfies preset qualifications for activating a band class selection process at the MS;
selecting a band class from among the multiple band classes identified by the multiple band class records within the EGSRDM; and
selecting an available frequency within that selected band class to assign to operation of the MS,
wherein when the preset qualifications are satisfied, activating the band class selection process of the utility to initiate the selecting of qualified band class records, and
wherein when the preset qualifications are not satisfied defaulting the mobile station to a conventional selection process that selects only a first record in the EGSRDM and a first available frequency from within the first record and maintaining a current frequency/channel assignment of the mobile station when no available frequency is found within the first record.

7. The mobile station of claim 6, wherein the preset qualifications comprise at least two of: (a) determining that a value of P_Rev is greater than or equal co a first pre-established value; (b) determining that a redirect record equals a second pre-established value; and (c) determining that multiple band class records exist within the received EGSRDM.

8. In a mobile communications network having a base station that generates multiple-record EGSRDMs, a mobile station (MS) comprising:
an element to receive an overhead message being broadcasted within a broadcast range of the network within which the MS is located;
a memory within which a band class selection utility is stored for use in selecting one or more band classes from a received EGSRDM that includes multiple band class records for multiple respective band classes;
a processor that executes said hand class selection utility, which when executed performs:
retrieving the EGSRDM from the overhead message;
determining whether the EGSRDM is a valid Multiple-record EGSRDM:
selecting a band class from among the multiple band classes identified by the multiple band class records within the EGSRDM; and
selecting an available frequency within that selected band class to assign to operation of the MS.
wherein when the EGSRDM is a valid multiple-record EGSRDM, said selecting of band class further comprises:
parsing the EGSRDM to separate the band class records portion thereof;
generating a list of qualified band class records that meet selection criteria for that mobile station, wherein said list comprises less than the full number of band class records within the EGSRDM when not all of the full number of band class records meet the selection criteria;
activating a band class selection mechanism that selects a first band class record within the list and subsequent band class records within the list when the first and previous selected band class records fail to provide an available frequency for assignment to the mobile station.

9. The mobile station of claim 8, said band class selection utility further comprising code that when executed provides:
checking an ACCOLC of the mobile station to determine if the ACCOLC is supported by the current band class record selected from the list;
checking whether a Mob_P_Rev value is within the range specified for the current record;
initiating system selection from the current record only when both the ACCOLC is supported and the Mob_P_Rev is within the specified range, wherein the system selection is provided via current redirection criteria of the mobile station.

10. The mobile station of claim 8, wherein said generating a list of qualified band class records further comprises including within the list each set of frequencies associated with each of the qualified band class records.

11. The mobile station of claim 8, wherein the selecting of an available frequency within the currently selected band class comprises:
  iteratively and sequentially checking each frequency beginning with a first frequency within a currently selected band class record until an available frequency is located;
  when an available frequency is located, assigning the available frequency to subsequent MS operations;
  when no available frequency is located within the currently selected band class record, returning a failed condition to the band class selection mechanism.

12. The mobile station of claim 11, further comprising:
  when a failed condition is returned, initiating a check for the available frequency within a next band class record within the list; and
  when the currently selected band class record is the last band class record within the list, activating a system determination substate.

13. The mobile station of claim 8, wherein the selecting of an available frequency within the selected band class comprises:
  hashing to a frequency within the selected band class;
  assigning the frequency hashed to when the frequency is an available frequency; and
  when the hashing does not yield an available frequency, initiating a current redirection criteria for selecting the available frequency, wherein the next available frequency is selected via a sequential check of frequencies within the current selected band class.

14. The mobile station of claim 8, further comprising when a last band class record within the list has been selected and there is no available frequency located therein, defaulting the mobile station selection to a system determination substate.

15. A communication network comprising: (1) at least one mobile station configured according to the mobile station of claims 6; and (2) at least one base station having associated therewith a mechanism for (a) providing multiple band class records within a single EGSRDM and (b) broadcasting the multiple-record EGSRDM within an overhead message.

16. A computer program product comprising a non-transitory computer readable medium for utilization within a mobile station (MS) of a wireless communication network, said computer program product comprising:
  program code on said non-transitory computer readable medium, said code providing the following functions when executed by a processor:
  retrieving an EGSRDM from an overhead message;
  determining whether the EGSRDM is a valid multiple-record EGSRDM, wherein the determining process further comprises:
    determining when the EGSRDM meets preset qualifications for activating a band class selection process at the MS, wherein the preset qualifications comprise at least two of: (a) determining that a value of P_Rev is greater than or equal to 11; (b) determining that a redirect record=010; and (c) determining that multiple band class records exist within the received EGSRDM; and
    when the EGSRDM meets the preset qualifications indicating that the EGSRDM is a valid multiple-record EGSRDM, activating the band class selection process to initiate the selecting of qualified band class records in the multiple-record EGSRDM corresponding to respective band classes, said selection process comprising:
      selecting a band class from among multiple band classes identified by the selected qualified band class records within the valid multiple-record EGSRDM; and
      selecting an available frequency within that selected band class to assign to operation of the MS,
    wherein when the EGSRDM is not a valid multiple-record EGSRDM defaulting the mobile station to a conventional selection process that selects only a first record in the EGSRDM and a first available frequency from within the first record and maintaining a current frequency/channel assignment of the mobile station when no available frequency is found within the first record.

17. A computer program product comprising a non-transitory computer readable medium for utilization within a mobile station of a wireless communication network, said computer program product comprising:
  program code on said non-transitory computer readable medium, said code providing the following functions when executed by a processor:
  retrieving an EGSRDM from an overhead message;
  determining whether the EGSRDM is a valid multiple-record EGSRDM, wherein the determining process further comprises:
    determining when the EGSRDM meets preset qualifications for activating a band class selection process at the MS, wherein the preset qualifications comprise at least two of: (a) determining that a value of P_Rev is greater than or equal to 11; (b) determining that a redirect record=010; and (c) determining that multiple band class records exist within the received EGSRDM; and
    when the EGSRDM meets the preset qualifications indicating that the EGSRDM is a valid multiple-record EGSRDM, activating the band class selection process to initiate the selecting of qualified band class records in the multiple-record EGSRDM corresponding to respective band classes, said selection process comprising:
      selecting a band class from among multiple band classes identified by the selected qualified band class records within the val id multiple-record EGSRDM; and
    selecting an available frequency within that selected band class to assign to operation of the MS;
  when any one of the preset qualifications is not satisfied:
    defaulting the mobile station to a conventional selection process that selects only a first record in the EGSRDM and a first available frequency from within the first record; and
  maintaining a current frequency/channel assignment of the mobile station when no available frequency is found within the first record; and
  when each of the preset qualifications is satisfied, said code for selecting of band class further comprises code for:
  parsing the EGSRDM to separate the band class records portion thereof;
  generating a list of qualified band class records that meet selection criteria for that mobile station, wherein said list comprises less than the full number of band class records within the EGSRDM when not all of the full number of band class records meet the selection criteria, wherein said code for generating a list of qualified band class records further comprises code for including within the list each set of frequencies associated with each of the qualified band class records;

activating a band class selection mechanism that selects a first band class record within the list and subsequent band class records within the list when the first and previous selected band class records fail to provide an available frequency for assignment to the mobile station; and when a last band class record within the list has been selected and there is no available frequency located therein, defaulting the mobile station selection to a system determination substate.

18. The computer program product of claim 16, said band class selection utility further comprising code that when executed provides the following functions:

checking an ACCOLC of the mobile station selected to determine if the ACCOLC is supported by the current band class record selected from the list;

checking whether the Mob_P_Rev value is within the range specified for the current record;

initiating system selection from the current record only when both the ACCOLC is supported and the Mob_P_Rev is within the specified range, wherein the system selection is provided via current redirection criteria of the mobile station.

19. The computer program product of claim 17, wherein said code for selecting an available frequency within the currently selected band class record comprises code for:

iteratively and sequentially checking each frequency beginning with a first frequency within the current band class record until an available frequency is located;

when an available frequency is located, immediately assigning the available frequency to subsequent MS operations;

when no available frequency is located within the current band class, returning a failed condition to the band class selection mechanism; and when a failed condition is returned from a frequency selecting process at a current band class record:
immediately initiating a check for the available frequency within a next sequential band class record within the list; and
when the current band class records is the last band class record within the list, activating a system determination substate.

20. A computer program product comprising a non-transitory computer readable medium for utilization within a mobile station (MS) of a wireless communication network, said computer program product comprising:

program code on said non-transitory computer readable medium, sad code providing the following functions when executed by a processor:

retrieving an EGSRDM from an overhead message;

determining whether the EGSRDM is a valid multiple-record EGSRDM, wherein the determining process further comprises:
determining when the EGSRDM meets preset qualifications for activating a band class selection process at the MS, wherein the preset qualifications comprise at least two of: (a) determining that a value of P_Rev is greater than or equal to 11; (b) determining that a redirect record=010; and (c) determining that multiple band class records exist within the received EGSR DM; and
when the EGSRDM meets the preset qualifications indicating that the EGSRDM is a valid multiple-record EGSRDM, activating the band class selection process to initiate the selecting of qualified band class records in the multiple-record EGSRDM corresponding to respective band classes, said selection process comprising:
selecting a band class from among multiple band classes identified by the selected qualified band class records within the valid multiple-record EGSRDM; and
selecting an available frequency within that selected band class to assign to operation of the MS;

wherein the code for selecting of an available frequency within the currently selected band class record comprises code for:

hashing to a frequency within the currently selected band class record;

assigning the frequency hashed to when the frequency is an available frequency;

and when the hashing does not yield an available frequency, initiating a current redirection criteria for selecting the available frequency, wherein the next available frequency is selected via a sequential check of frequencies within the current band class record.

21. A method to reduce over-the-air signaling associated with channel load balancing in a wireless communication network, said method comprising:

selecting particular frequencies from among multiple utilized frequencies to associate with band classes supported within the network, said particular frequencies corresponding to frequencies having greater available bandwidth than others of the multiple utilized frequencies;

generating an extended global service redirection message (EGSRDM);

inserting within the EGSRDM multiple band class records corresponding to the band classes along with their associated particular frequencies;

inserting band class selection data into multiple band class records within the EGSRDM that enables a mobile station receiving the EGSRDM to automatically determine which of the multiple band classes and frequencies are to be utilized by the particular type of mobile station; and broadcasting the EGSRDM to mobile stations within the broadcast range via an overhead message;

wherein said mobile stations are designed with band class selection mechanisms that select particular band class records from among the multiple band class records inserted within the broadcast EGSRDM, such that the selected particular band class records enable the mobile stations to select a frequency that has greater available bandwidth and provide indirect load balancing to the network.

22. The method of claim 21, further comprising:

providing a P_Rev value and ACCOLC value for each of the multiple band class records within the EGSDRM;

configuring said EGSDRM with a characteristic that indicates that said EGSDRM has multiple band class records included therein;

wherein said mobile stations select the particular band class records based on a match of the P_Rev values with the Mob_P_Rev value and the ACCOLC value with that of the mobile station; and wherein said mobile station includes a channel hashing mechanism that operates along with the band class selection mechanism to hash to a frequency within selected ones of the particular band class records and assigns the hashed to frequency to mobile station operations when the hashed to frequency is available.

23. A base station comprising:
a memory containing code to generate a service redirection message; and
a processor to execute the code to:
- allocate plural band class records for inclusion within the service redirection message based on analysis of network load conditions;
- provide within each band class record of the plural band class records particular frequencies that have relatively more available bandwidth among all frequencies supported by corresponding band classes identified by the plural band class records, each band class being associated with at least one frequency and at least one revision indicator;
- insert the plural band class records into the service redirection message; and
- broadcast the service redirection message to mobile stations to enable at least one of the mobile stations to select from among the plural band classes identified by the service redirection message.

* * * * *

UNITED STATES PATENT AND TRADEMARK OFFICE
CERTIFICATE OF CORRECTION

| | | |
|---|---|---|
| PATENT NO. | : 8,509,801 B1 | Page 1 of 1 |
| APPLICATION NO. | : 11/246758 | |
| DATED | : August 13, 2013 | |
| INVENTOR(S) | : Chung-Ching Wang et al. | |

It is certified that error appears in the above-identified patent and that said Letters Patent is hereby corrected as shown below:

In the Claims:

Claim 17, Column 16, Line 43, please delete "val id" and substitute --valid--

Claim 20, Column 17, Line 63, please delete "EGSR DM" and substitute --EGSRDM--.

Signed and Sealed this
Twenty-eighth Day of January, 2014

Michelle K. Lee
*Deputy Director of the United States Patent and Trademark Office*